US009509246B2

(12) United States Patent
Burke (10) Patent No.: US 9,509,246 B2
(45) Date of Patent: Nov. 29, 2016

(54) CONTROL SYSTEM FOR AN ELECTRIC MOTOR

(71) Applicant: PROTEAN ELECTRIC LIMITED, Surrey (GB)

(72) Inventor: Richard Burke, Hook (GB)

(73) Assignee: PROTEAN ELECTRIC LIMITED (GB)

( * ) Notice: Subject to any disclaimer, the term of this patent is extended or adjusted under 35 U.S.C. 154(b) by 0 days.

(21) Appl. No.: 14/646,687

(22) PCT Filed: Nov. 21, 2013

(86) PCT No.: PCT/IB2013/060314
§ 371 (c)(1),
(2) Date: May 21, 2015

(87) PCT Pub. No.: WO2014/080361
PCT Pub. Date: May 30, 2014

(65) Prior Publication Data
US 2015/0303857 A1 Oct. 22, 2015

(30) Foreign Application Priority Data
Nov. 23, 2012 (GB) .................................. 1221129.8

(51) Int. Cl.
*H02P 27/04* (2016.01)
*H02P 27/06* (2006.01)
(Continued)

(52) U.S. Cl.
CPC ............... *H02P 27/06* (2013.01); *H02K 11/33* (2016.01); *H02P 25/22* (2013.01); *H02K 3/28* (2013.01); *H02K 16/04* (2013.01); *H02K 2213/12* (2013.01); *Y02T 10/641* (2013.01)

(58) Field of Classification Search
CPC ............. H02P 27/04; H02P 6/00; H02P 1/42
USPC ............ 318/400.01, 400.02, 400.14, 400.15, 318/700, 701, 721, 799, 800, 801, 430, 432, 318/599, 811, 34, 38, 53, 490, 543, 546; 388/800, 819; 363/40, 95, 120, 175
See application file for complete search history.

(56) References Cited

U.S. PATENT DOCUMENTS 5,223,775 A * 6/1993 Mongeau .................. H02P 6/10
                                                    318/400.38
6,676,400 B2 * 1/2004 Ito ........................... B29C 45/76
                                                    318/801
(Continued)

FOREIGN PATENT DOCUMENTS

GB    2472297 A    2/2011
JP    2009067174 A 4/2009
JP    201141420 A  2/2011

OTHER PUBLICATIONS

European Patent Office; International Search Report; Jun. 16, 2015; World Intellectual Property Organization; Munich.
(Continued)

*Primary Examiner* — Antony M Paul
(74) *Attorney, Agent, or Firm* — The Mason Group Patent Specialists, LLC; Valerie M. Davis (57) ABSTRACT

A control system for an electric motor, the control system comprising a first control device arranged to control current in a first coil set of the electric motor and a second control device arranged to control current in a second coil set of the electric motor; wherein the first control device includes a first interface arrangement for receiving data from a first controller for allowing the first control device to determine a required current flow in the first coil set, wherein the first interface arrangement is arranged to communicate data to the second control device for allowing the second control device to determine a required current flow in the second coil set.

9 Claims, 5 Drawing Sheets (51) Int. Cl.
   *H02P 25/22* (2006.01)
   *H02K 3/28* (2006.01)
   *H02K 16/04* (2006.01)

(56) References Cited

U.S. PATENT DOCUMENTS

| | | | | |
|---|---|---|---|---|
| 8,638,003 B2* | 1/2014 | Hashimoto | ............. | F02D 29/06 290/27 |
| 2006/0279166 A1* | 12/2006 | Takeuchi | ................. | H02K 3/28 310/268 |
| 2009/0302792 A1* | 12/2009 | Osada | ................... | H02P 29/032 318/400.21 |
| 2012/0187893 A1 | 7/2012 | Baba et al. | | |

OTHER PUBLICATIONS

European Patent Office; Written Opinion of the Searching Authority; Jun. 16, 2015; World Intellectual Property Organization; Munich.

Intellectual Property Office; Search Report; Jun. 16, 2015; Intellectual Property Office; South Wales.

* cited by examiner

CONTROL SYSTEM FOR AN ELECTRIC MOTOR

The present invention relates to a control system, in particular a control system for an electric motor.

Electric motor systems typically include an electric motor and a control unit arranged to control the power/torque generated by the electric motor. Examples of known types of electric motor include the induction motor, synchronous brushless permanent magnet motor, switched reluctance motor and linear motor. In the commercial arena three phase electric motors are the most common kind of electric motor available.

A three phase electric motor typically includes three coil sets, where each coil set is arranged to generate a magnetic field associated with one of the three phases of an alternating voltage.

To increase the number of magnetic poles formed within an electric motor, each coil set will typically have a number of coil sub-sets that are distributed around the periphery of the electric motor, which are driven to produce a rotating magnetic field.

The three coil sets of a three phase electric motor are typically configured in either a delta or wye configuration.

A control unit for a three phase electric motor having a DC power supply will typically include a three phase bridge inverter that generates a three phase voltage supply for driving the electric motor. Each of the respective voltage phases is applied to a respective coil set of the electric motor.

A three phase bridge inverter includes a number of switching devices, for example power electronic switches such as Insulated Gate Bipolar Transistor (IGBT) switches.

However, power electronic switches will typically exhibit switching losses and conduction losses.

Including switching losses and conduction losses, the total losses are approximately proportional to the square of the power. This can impose serious thermal management problems for the motor and inverter since, for example, a doubling of the power leads to a fourfold increase in thermal losses. Extracting this heat without elevating the temperature of the device above its safe operating level becomes the limiting factor in the amount of power the device can handle. Indeed, today larger power devices having intrinsic current handling capabilities of, for example, 500 A are restricted to 200 A due to thermal constraints.

For a conventional three phase motor with a given power rating, if a larger power rating is desired this can be achieved by producing a motor with a larger diameter. For a larger motor diameter, the peripheral speed of the rotor increases for a given angular velocity. However, for a given supply voltage this requires that the motor coils have a reduced number of turns.

One solution that has been proposed to overcome this limitation has been the development of electric motors having a number of sub-motors that can operate independently of each other, where the current flow in the coil sub-sets of one sub-motor is independent of the current flow in the coil sub-sets of another sub-motor (i.e. the respective coil sub-sets are not connected in series). Consequently, the coils of each coil sub-set can have a larger number of turns than for an equivalent motor in which all respective coil sub-sets are connected in series. The increased number of turns in each coil increases the overall inductance of the motor. This means that lower currents can be used in the coils of each coil sub-set, which leads to fewer heat dissipation problems, and which allows smaller switching devices to be used. The use of smaller switching devices in turn allows for faster switching speeds and lower switching losses.

However, for an electric motor having a number of independent sub-motors, if each sub-motor where to have its own communication interface for communicating directly with a remotely mounted vehicle controller this would result in extra communication lines having to be run between the vehicle controller and the electric motor, which would result in an increase in weight and cost of the vehicle.

It is desirable to improve this situation.

In accordance with an aspect of the present invention there is provided a control system according to the accompanying claims.

The invention as claimed has the advantage of providing a communication system for controlling the operation of an electric motor having a plurality of sub-motors, where each sub-motor may be independently controlled via an external controller while only using a single communication interface to the electric motor. Further, if a fault occurs with a communication line used for controlling the operation of one of the sub-motors it is still possible for the sub-motor to receive control data.

The present invention will now be described, by way of example, with reference to the accompanying drawings, in which.

The embodiment of the invention described is for a control system for an electric motor for use in a wheel of a vehicle, however the electric motor may be located anywhere within the vehicle. The motor is of the type having a set of coils being part of the stator for attachment to a vehicle, radially surrounded by a rotor carrying a set of magnets for attachment to a wheel. For the avoidance of doubt, the various aspects of the invention are equally applicable to an electric generator having the same arrangement. As such, the definition of electric motor is intended to include electric generator. In addition, some of the aspects of the invention are applicable to an arrangement having the rotor centrally mounted within radially surrounding coils. As would be appreciated by a person skilled in the art, the present invention is applicable for use with other types of electric motors.

Figure 1:
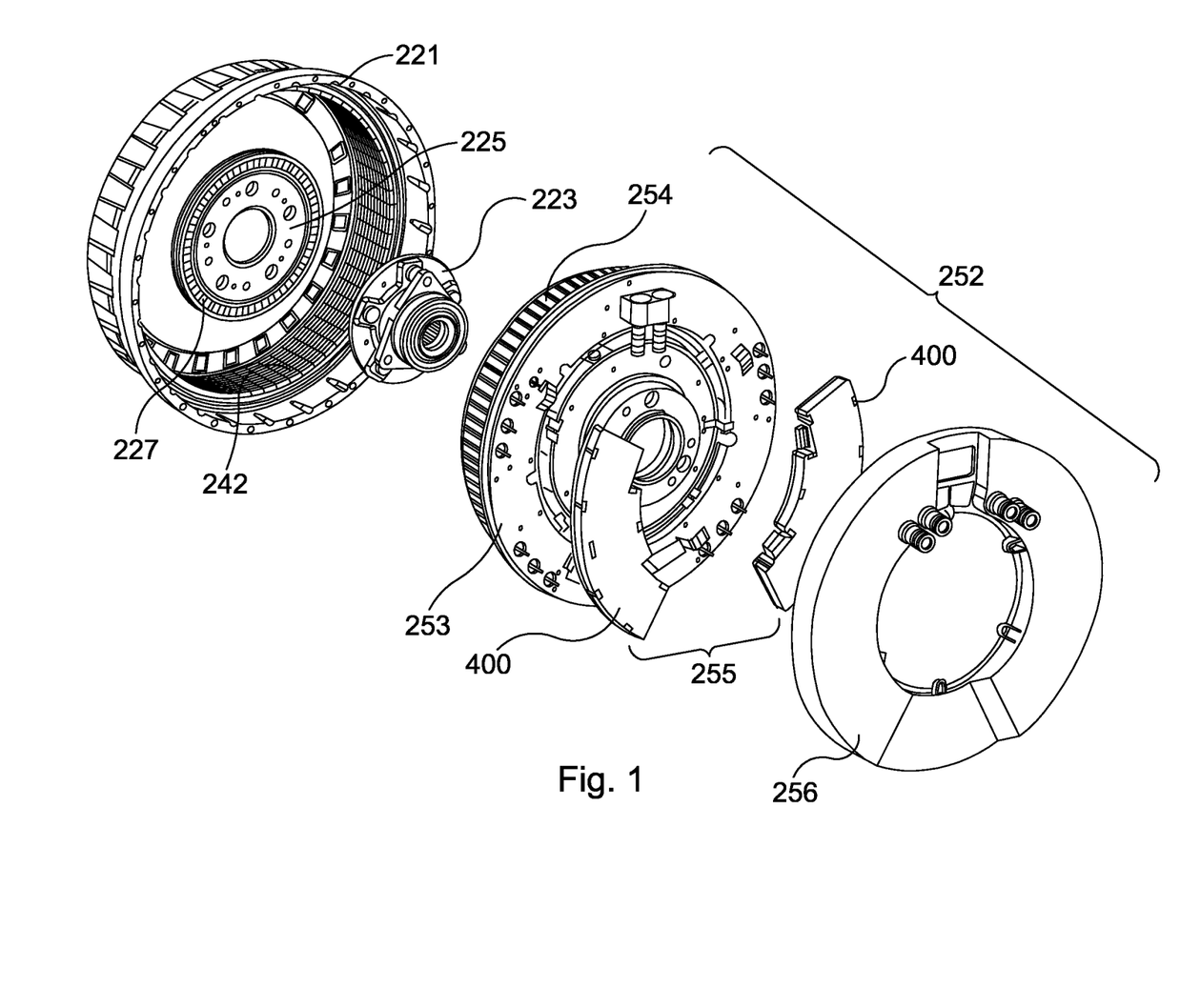
FIG. 1 illustrates an exploded view of an electric motor as used in an embodiment of the present invention.

For the purposes of the present embodiment, as illustrated in FIG. 1, the in-wheel electric motor 40 includes a stator 252 comprising a heat sink 253, multiple coils 254 and an electronics module 255 mounted in a rear portion of the stator for driving the coils. The coils 254 are formed on stator tooth laminations to form coil windings. A stator cover 256 is mounted on the rear portion of the stator 252, enclosing the electronics module 255 to form the stator 252, which may then be fixed to a vehicle and does not rotate relative to the vehicle during use.

Figure 4:
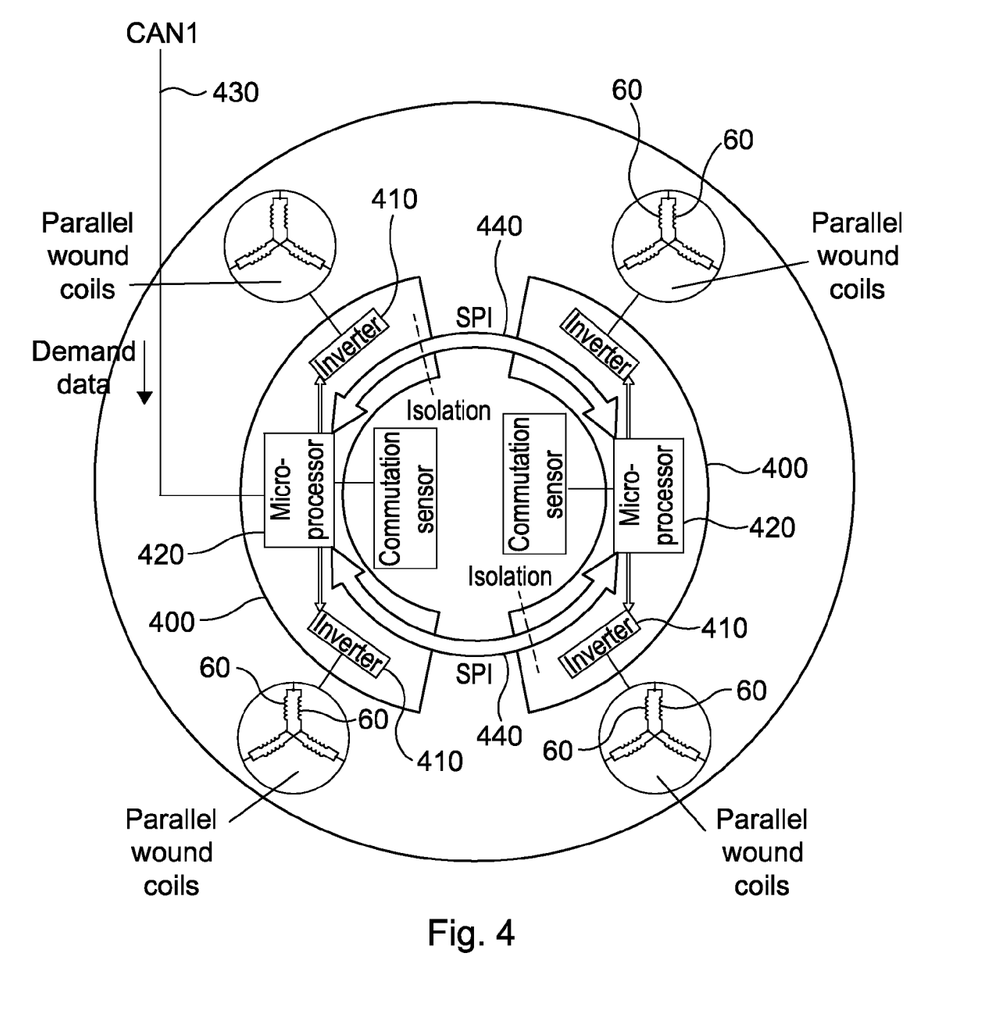
FIG. 4 illustrates a first drive arrangement for an electric motor according to an embodiment of the present invention.
Figure 5:
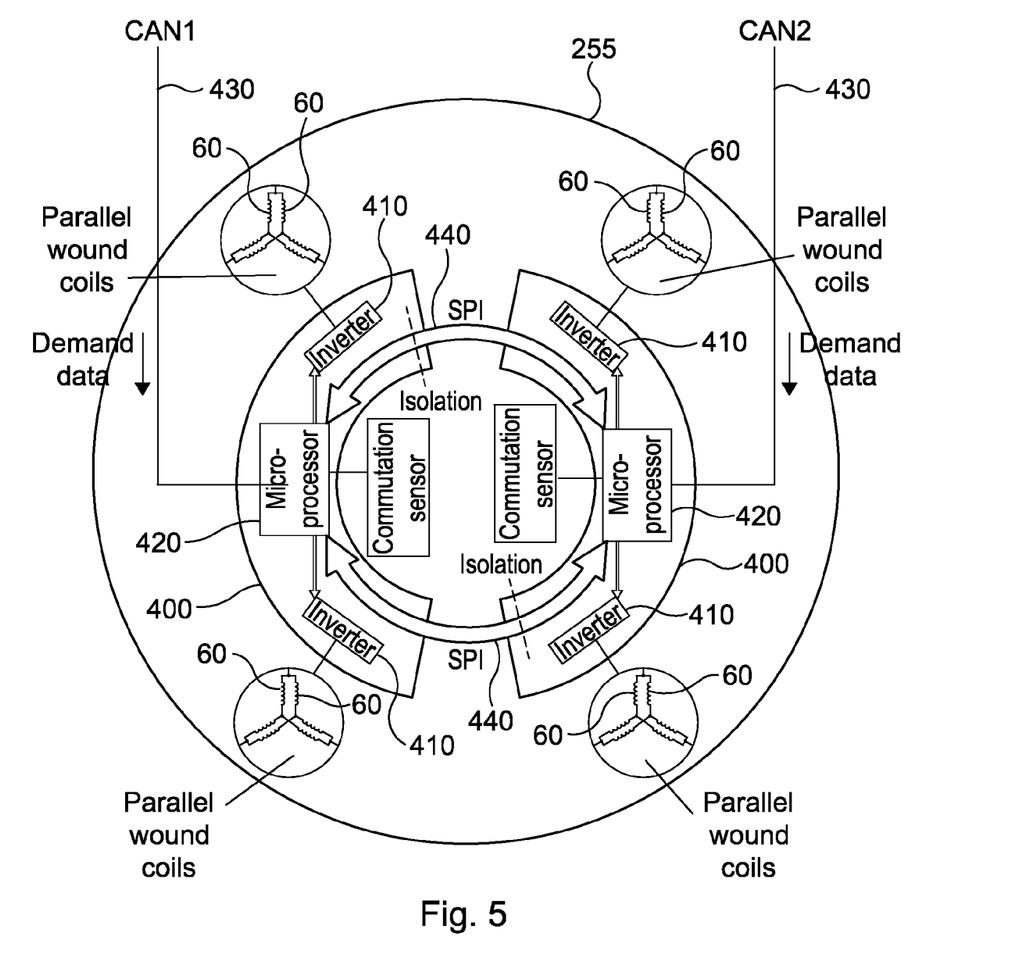
FIG. 5 illustrates a second drive arrangement for an electric motor according to an embodiment of the present invention.

In a preferred embodiment, the electronics module 255 includes two control devices 400, where each control device 400 includes two inverters 410 and control logic 420, which in the present embodiment includes a processor, for controlling the operation of the inverters 410, as illustrated in FIG. 4 and FIG. 5.

A rotor 240 comprises a front portion 220 and a cylindrical portion 221 forming a cover, which substantially surrounds the stator 252. The rotor includes a plurality of permanent magnets 242 arranged around the inside of the cylindrical portion 221. For the purposes of the present embodiment 32 magnet pairs are mounted on the inside of the cylindrical portion 221. However, any number of magnet pairs may be used.

The magnets are in close proximity to the coils windings on the stator 252 so that magnetic fields generated by the coils interact with the magnets 242 arranged around the inside of the cylindrical portion 221 of the rotor 240 to cause the rotor 240 to rotate. As the permanent magnets 242 are utilized to generate a drive torque for driving the electric motor, the permanent magnets are typically called drive magnets.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 233 of the wall of the stator 252 and also to a central portion 224 of the housing wall 220 of the rotor 240. The rotor 240 is thus rotationally fixed to the vehicle with which it is to be used via the bearing block 223 at the central portion 225 of the rotor 240. This has an advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 224 of the rotor through into the bearing block itself. With both the rotor 240 and the wheel being mounted to the bearing block 223 there is a one to one correspondence between the angle of rotation of the rotor and the wheel.

Figure 2:
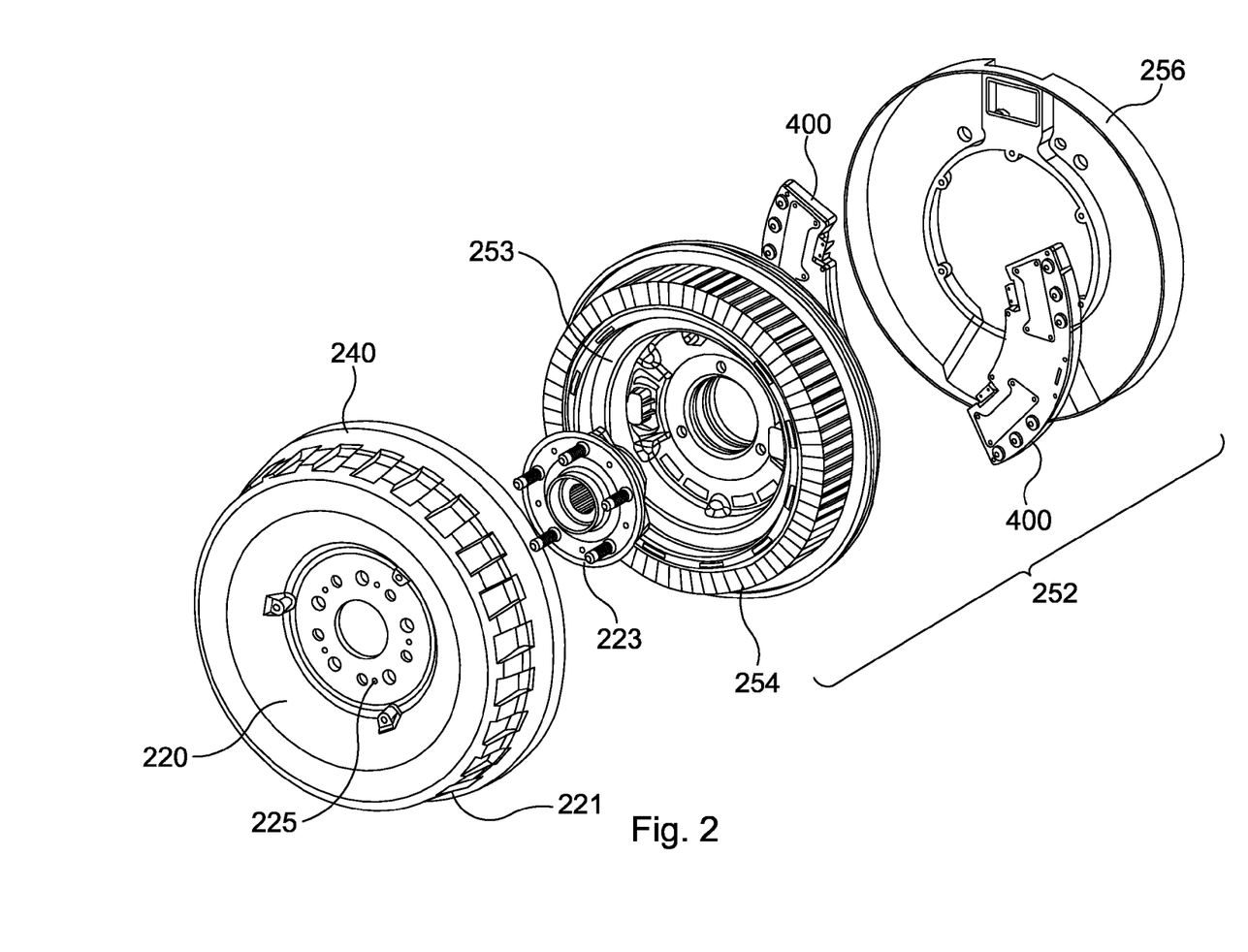
FIG. 2 illustrates an exploded view of the electric motor shown in FIG. 1 from an alternative angle.

FIG. 2 shows an exploded view of the same assembly as FIG. 1 from the opposite side showing the stator 252 and rotor. The rotor 240 comprises the outer rotor wall 220 and circumferential wall 221 within which magnets 242 are circumferentially arranged. As previously described, the stator 252 is connected to the rotor 240 via the bearing block at the central portions of the rotor and stator walls.

A V shaped seal is provided between the circumferential wall 221 of the rotor and the outer edge of the stator.

The rotor also includes a set of magnets 227 for position sensing, otherwise known as commutation magnets, which in conjunction with sensors mounted on the stator allows for a rotor flux angle to be estimated. The rotor flux angle defines the positional relationship of the drive magnets to the coil windings. Alternatively, in place of a set of separate magnets the rotor may include a ring of magnetic material that has multiple poles that act as a set of separate magnets.

To allow the commutation magnets to be used to calculate a rotor flux angle, preferably each drive magnet has an associated commutation magnet, where the rotor flux angle is derived from the flux angle associated with the set of commutation magnets by calibrating the measured commutation magnet flux angle. To simplify the correlation between the commutation magnet flux angle and the rotor flux angle, preferably the set of commutation magnets has the same number of magnet or magnet pole pairs as the set of drive magnet pairs, where the commutation magnets and associated drive magnets are approximately radially aligned with each other. Accordingly, for the purposes of the present embodiment the set of commutation magnets has 32 magnet pairs, where each magnet pair is approximately radially aligned with a respective drive magnet pair.

A sensor, which in this embodiment is a Hall sensor, is mounted on the stator. The sensor is positioned so that as the rotor rotates each of the commutation magnets that form the commutation magnet ring respectively rotates past the sensor.

As the rotor rotates relative to the stator the commutation magnets correspondingly rotate past the sensor with the Hall sensor outputting an AC voltage signal, where the sensor outputs a complete voltage cycle of 360 electrical degrees for each magnet pair that pass the sensor.

To aid in the determination of the direction of the rotor, the sensor may also have an associated second sensor placed 90 electrical degrees apart.

Figure 3:
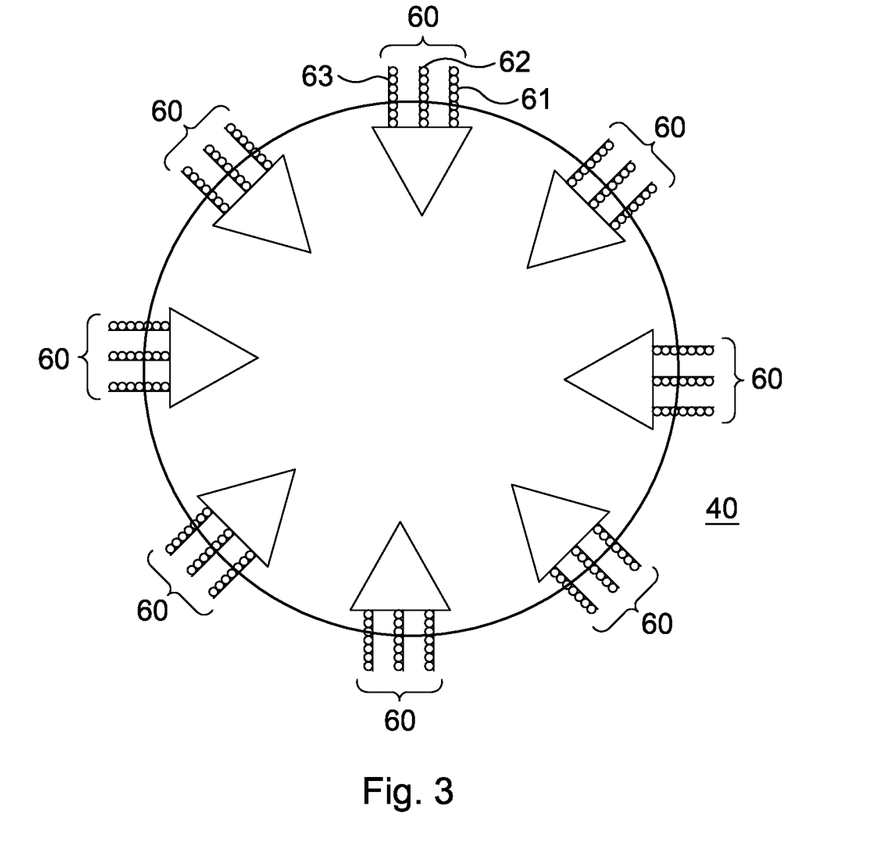
FIG. 3 illustrates an example arrangement of coil sets for an electric motor according to an embodiment of the present invention.

As illustrated in FIG. 3, the motor 40 in this embodiment includes eight coil sets 60 with each coil set 60 having three coil sub-sets 61, 62, 63 that are coupled in a wye configuration to form a three phase sub-motor, resulting in the motor having eight three phase sub-motors.

FIG. 4 illustrates the connections between the respective coil sets 60 and the control devices 400 housed in the electronics module 255, where pairs of the coil sets 60 are connected in parallel with each pair of parallel coupled coil sets 60 being connected to a respective three phase inverter 410 included on a control device 400. As is well known to a person skilled in the art, a three phase inverter contains six switches, where a three phase alternating voltage may be generated by the controlled operation of the six switches.

The star points of the parallel coupled coil sets 60 are not electrically coupled. In an alternative embodiment each of the coil sets 60 may be connected to a separate inverter.

As stated above, the electronics module 255 includes two control devices 400, with each control device 400 having two inverters 410 that are coupled to a respective pair of parallel coupled coil sets 60. Additionally, each control device 400 includes an interface arrangement, where in a first embodiment the interface arrangement on each control device 400 is arranged to allow communication between the respective control devices 400 housed in the electronics module 255 with one control device 400 being arranged to communicate with a vehicle controller mounted external to the electric motor, where the processor 420 on each control device 400 is arranged to handle communication over the interface arrangement, as described in detail below.

The processors 420 on the respective control devices 400 are arranged to control the inverters 410 included on the respective control device 400 to allow each of the electric motor coil sets 60 to be supplied with a three phase voltage supply, thereby allowing the respective coil sub-sets 61, 62, 63 to generate a rotating magnetic field. Although the present embodiment describes each coil set 60 as having three coil sub-sets 61, 62, 63, the present invention is not limited by this and it would be appreciated that each coil set 60 could have two or more coil sub-sets. Equally, although the present embodiment describes an electric motor having eight coil sets 60 (i.e. eight sub motors) the motor could have one or more coil sets with an associated control device.

Under the control of the respective processors 420, each three phase bridge inverter 410 is arranged to provide PWM voltage control across the respective coil sub-sets 61, 62, 63, thereby generating a current flow in the respective coil sub-sets to provide a required torque for the respective sub-motors.

For a given coil set 60 the three phase bridge inverter 410 switches are arranged to apply a single voltage phase across each of the coil sub-sets 61, 62, 63.

The inverter switches can include semiconductor devices such as MOSFETs or IGBTs. In the present example, the switches comprise IGBTs. However, any suitable known switching circuit can be employed for controlling the current. One well known example of such a switching circuit is the three phase bridge circuit having six switches configured to drive a three phase electric motor. The six switches are configured as three parallel sets of two switches, where each pair of switches is placed in series and from a leg of the three phase bridge circuit.

The plurality of switches are arranged to apply an alternating voltage across the respective coil sub-sets.

As described above, the plurality of switches are configured to form an n-phase bridge circuit. Accordingly, as is well known to a person skilled in the art, the number of switches will depend upon the number of voltage phases to be applied to the respective sub motors. Although the current design shows each sub motor having a three phase construction, the sub motors can be constructed to have any number of phases.

The wires (e.g. copper wires) of the coil sub-sets 61, 62, 63 may be connected directly to the switching devices that form part of the inverters 410, as appropriate.

As described below, in the present embodiment, one of the control devices 400 included in the electronics module 255 is arranged to receive torque demand requests over a communication line from an external vehicle controller, where the torque demand requests received at the control device 400 is transmitted by the control device 400 to the other control device 400 housed in the electronics module 255 over a different communication line. Optionally, status information may also be provided from the control devices 400 to the vehicle controller.

To allow one of the control devices 400 to communicate with an external vehicle controller, the interface arrangement for this control device 400 includes a controller area network CAN interface for allowing the control device 400 to communicate with the external vehicle controller over a CAN bus 430. The control device 400 coupled to the CAN bus 430 is designated the master control device with the other control device 400 housed in the electronics module 255 being designated the secondary control device Additionally, the interface arrangement for both control devices 400 housed within the electronics module 255 includes two serial peripheral interface SPI devices for allowing communication between both electronics module control devices over two separate SPI buses 400.

Although the interface arrangement of the present embodiment includes two SPI interfaces for communicating over two SPI buses 440, the second SPI interface is for increased communication redundancy with the second SPI bus being used should a fault occur with the first SPI bus. In an alternative embodiment the interface arrangement may have a single SPI interface for allowing communication between both control devices 400 housed within the electronics module using a single SPI bus.

As is well known to a person skilled in the art, a CAN bus is a multi-master broadcast serial bus and a SPI bus is a synchronous serial data link standard that operates in full duplex mode.

Although the present embodiment describes the use of a CAN bus for communicating between a control device 400 and an external vehicle controller and an SPI bus for communicating between two control devices 400 housed within an electronics module, the present invention is applicable for use with other types of communication buses.

In a first mode of operation, the vehicle controller is arranged to transmit a torque demand request to the master control device 400 over the CAN bus 430. The torque demand request transmitted over the CAN bus 430 corresponds to the total torque that the electric motor is required to generate based upon a drivers input, for example based on a throttle demand generated within the vehicle.

Preferably, the control data transmitted over the CAN bus 430 by the vehicle controller also includes an enable signal, where the enable signal is arranged to enable or disable the motor depending upon whether the enable signal has been set active or inactive.

Although other data may also be communicated over the CAN bus 430, as this is not specific to the present invention it will not be described in any further detail.

The master control device 400 is arranged to read the enable signal and total torque demand request communicated over the CAN bus 430 and communicate the received data, that is to say the enable signal and total torque demand request, over one of the SPI buses 440 to the secondary control device 400.

The secondary control device 400 is arranged to read the total torque demand request and enable signal received over the SPI bus 440.

If the enable signal on the CAN bus 430 has been set to active, the processor 420 on the master control device 400 is arranged to control the inverter switches on the master control device 400 to control current flow in the four coil sets 60 coupled to the master control device 400, where the current flow is controlled to provide a required drive torque based on the torque demand transmitted over the CAN bus 430. In particular, for the present embodiment, where the current flow through the plurality of coil sets 60 is controlled using two control devices 400, the master control device 400 is arranged to control current flow in the coil sets 60 coupled to the master control device 400 to generate half the total torque demand received over the CAN bus 430. Correspondingly, the processor 420 on the secondary control device 400 is arranged to control the inverter switches on the secondary control device 400 to control current flow in the four coil sets 60 coupled to the secondary control device 400 so that the other half of the total torque demand request transmitted by the external vehicle controller, and received by the secondary control device 400 over the SPI bus 440, is generated by the secondary control device 400.

The control devices 400 included in the electronics module 255 are preconfigured to provide a predetermined ratio of the total torque demand request transmitted over the CAN bus 430 by the vehicle controller, where any predetermined ratio may be used. For example, for an electric motor having four control devices the predetermined ratio for each control device may be a quarter of the total torque demand request. Alternatively, the ratio of total torque demand request generated by the respective control devices 400 may be dynamically allocated, for example using the external vehicle controller or set by one of the control devices 400.

Accordingly, in the first mode of operation a torque demand request generated by an vehicle controller external to an electric motor may be provided to two or more control devices 400, that is to say two or more sub-motors within an electric motor, using a single CAN bus 430, thereby reducing the required number of CAN buses within a vehicle.

Preferably, for increased redundancy the master control device 400 may transmit the total torque demand request and enable signal to the secondary control device 400 over both SPI buses 440, where if the secondary control device 400 detects a fault with one SPI bus 440 the secondary control device 400 can read the total torque demand request and enable signal communicated over the other SPI bus 440.

In a further alternative embodiment, as illustrated in FIG. 5, to increase communication redundancy each control device 400 housed in the electronics module 255 may include a separate CAN interface for allowing both control devices 400 to communicate with the external vehicle controller over a CAN bus, where the external vehicle controller is arranged to transmit the total torque demand request to both control devices 400 housed in the electronics module 255.

In this embodiment, as with the previous embodiment, the master control device 400 continues to read the total torque demand request transmitted over the CAN bus 430 and provides the received data to the secondary control device 400 over at least one of the SPI buses 440. Although the torque demand request and enable signal are also communicated to the secondary control device 400 over the CAN bus 430 coupled to the secondary control device 400; while the master control device 400 is able to receive this data over the CAN bus 430 coupled to the master control device 400 the secondary control device 400 is arranged to not process the data received over the CAN bus 430 coupled to the secondary control device 400.

However, if the master control device 400 detects a fault associated with the CAN bus 430 coupled to the master control device 400, for example if no data is received within designated time period, the master control device 400 transmits a fault indicator over at least one of the SPI buses 440 to the secondary control device 400.

Upon the secondary control device 400 receiving a fault indicator over one or more of the SPI buses 440 indicating that the master control device 400 has detected a fault with the CAN bus 430 connected to the master control device 400, the secondary control device 400 is arranged to take over the communication functions of the master control device 400. In particular, the secondary control device 400 is arranged to read the enable signal and total torque demand request communicated over the CAN bus 430 coupled to the second control device 400 and transmit this data over at least one of the SPI buses 440 to the master control device 400.

The master control device 400 is arranged to read the total torque demand request and enable signal received over the SPI bus 440.

In this embodiment, the master control device 400 may continue to monitor the CAN bus 430 connected to the master control device 400 to determine whether the fault associated with the CAN bus 430 has been resolved. If the master control device 400 determines that the fault has been resolved the normal operational mode may be reestablished.

As with the previous embodiment, in this embodiment when the enable signal on the CAN bus 430 has been set to active, the processor 420 on the secondary control device 400 is arranged to control the inverter switches on the secondary control device 400 to control current flow in the four coil sets 60 coupled to the secondary control device 400 to allow half the total torque included in the torque demand request received over the CAN bus 430 to be generated.

Correspondingly, the processor 420 on the master control device 400 is arranged to control the inverter switches on the master control device 400 to control current flow in the four coil sets 60 coupled to the master control device 400 to allow half the total torque included in the torque demand request received over the SPI bus 440 to be generated.

It will be apparent to those skilled in the art that the disclosed subject matter may be modified in numerous ways and may assume embodiments other than the preferred forms specifically set out as described above, for example the electronics module 255 may include more than two control devices 400 arranged to drive one or more coil sets, where only a sub-set of the control devices are arranged to communicate directly with an external vehicle controller.

The invention claimed is:

1. A control system for an electric motor, the control system comprising a first control device arranged to control current in a first coil set of the electric motor and a second control device arranged to control current in a second coil set of the electric motor;
wherein the first control device includes a first interface arrangement for receiving data from a first controller for allowing the first control device to determine a required current flow in the first coil set, wherein the first interface arrangement is arranged to communicate data to the second control device for allowing the second control device to determine a required current flow in the second coil set, wherein the second control device includes a second interface arrangement for receiving data from the first controller for allowing the second control device to determine a required current flow in the second coil set, wherein the second interface arrangement is arranged to communicate data to the first control device for allowing the first control device to determine a required current flow in the first coil set.

2. A control system according to claim 1, wherein the first interface arrangement includes a first interface arranged to communicate with the controller and a second interface arranged to communicate with the second control device.

3. A control system according to claim 2, wherein the second interface is arranged to communicate over a serial peripheral interface bus.

4. A control system according to claim 2, wherein the first interface is arranged to communicate over a CAN bus.

5. A control system according to claim 1, wherein the data received by the first control device corresponds to a torque value to be generated by the electric motor.

6. A control system according to claim 1, wherein the second interface arrangement includes a third interface arranged to communicate with the controller and a fourth interface arranged to communicate with the first control device.

7. A control system according to claim 6, wherein the fourth interface is arranged to communicate over a serial peripheral interface bus.

8. A control system according to claim 6, wherein the third interface is arranged to communicate over a CAN bus.

9. A control system according to claim 1, wherein the data received by the second control device corresponds to a torque value to be generated by the electric motor.

* * * * *